(12) United States Patent
Khasnis et al.

(10) Patent No.: US 9,520,156 B2
(45) Date of Patent: Dec. 13, 2016

(54) CONTENT PREVIEW GENERATION

(75) Inventors: Kaustubh Murlidhar Khasnis, Maharashtra (IN); Pawan Gupta, Karnataka (IN); Smita Wadhwa, Karnataka (IN)

(73) Assignee: Excalibur IP, LLC, Sunnyvale, CA (US)

( * ) Notice: Subject to any disclaimer, the term of this patent is extended or adjusted under 35 U.S.C. 154(b) by 956 days.

(21) Appl. No.: 12/872,626

(22) Filed: Aug. 31, 2010

(65) Prior Publication Data
US 2012/0050318 A1  Mar. 1, 2012

(51) Int. Cl.
*G09G 5/00*  (2006.01)
*H04N 5/222*  (2006.01)
*G11B 27/28*  (2006.01)
*G06F 17/30*  (2006.01)
*G11B 27/029*  (2006.01)

(52) U.S. Cl.
CPC ......... *G11B 27/28* (2013.01); *G06F 17/30781* (2013.01); *G11B 27/029* (2013.01)

(58) Field of Classification Search
CPC ........................... G06F 17/30781; G11B 27/22
USPC ........... 345/625, 633–364; 348/231.2, 231.5; 715/723–726
See application file for complete search history.

(56) References Cited

U.S. PATENT DOCUMENTS

| 2010/0281376 A1* | 11/2010 | Meaney et al. | 715/723 |
| 2011/0292229 A1* | 12/2011 | Deever | 348/222.1 |
| 2011/0292245 A1* | 12/2011 | Deever | 348/231.2 |
| 2011/0293018 A1* | 12/2011 | Deever | 375/240.25 |

* cited by examiner

*Primary Examiner* — Jin-Cheng Wang
(74) *Attorney, Agent, or Firm* — James J. DeCarlo; Greenberg Traurig LLP

(57) ABSTRACT

A content preview of a content item is generated by extracting one or more clips from the content item, each clip is identified using a clipping point, a clip duration, a starting point, which is identified using the clipping point, and an ending point, which is identified using the clip's starting point and clipping duration. By way of a non-limiting example, shot boundaries are identified within the content item, the clip's starting point is identified to be the shot boundary before and closest to the clip's clipping point, the clip's ending point is identified to be the shot boundary after and closest to the clip's starting point plus clip duration. In a case that multiple clips are generated for the content preview, the clips are multiplexed to form the content preview. In a case that the content item comprises different types of content, such as audio and video content, the audio and video content is extracted from the content item for each clip, and synchronized to form the clip.

24 Claims, 6 Drawing Sheets

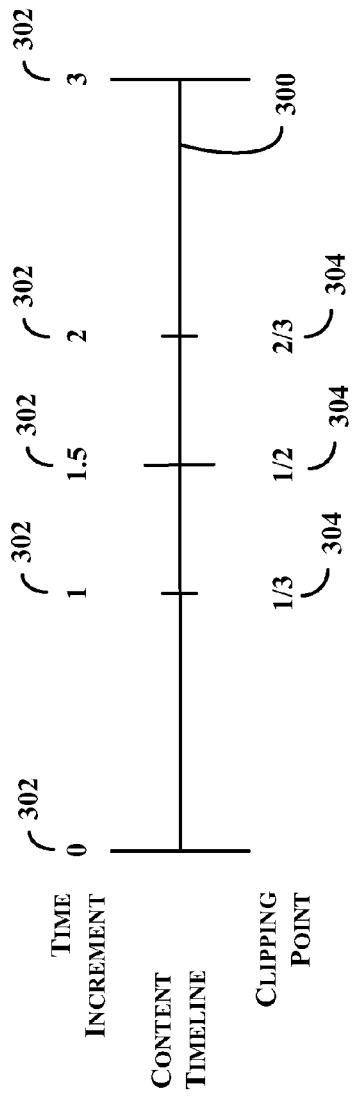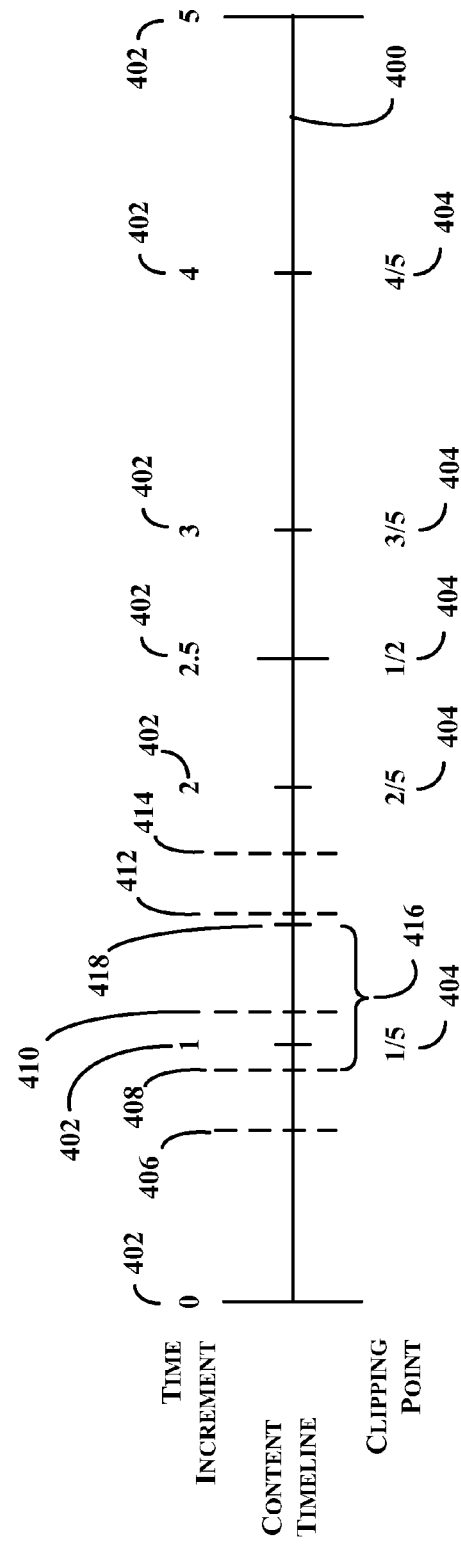

CONTENT PREVIEW GENERATION

FIELD OF THE DISCLOSURE

Figure 1:
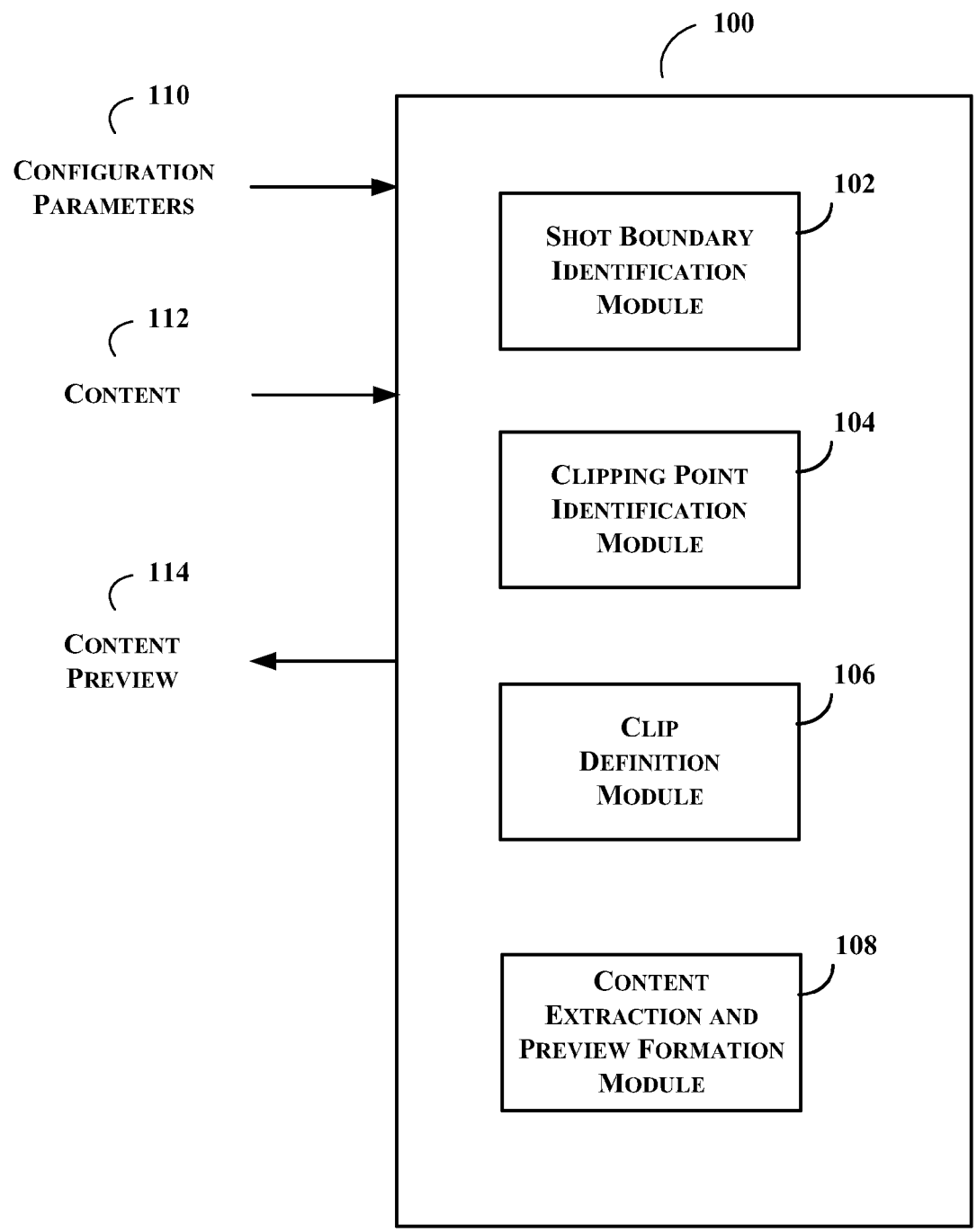

The present disclosure relates to previewing content, and more particularly to generating one or more previews of the content.

BACKGROUND

A considerable amount of content, which can comprise content such as audio, video or multimedia content, has become available to users to experience at a computing device using a content player. In one example, the content can be delivered to the user's device via a network, such as the internet, storage media, or some delivery interface, such as USB, fire wire, etc. Search tools allow the user to retrieve a set of search results that satisfy a search criteria input by the user. A search tool can rank the search results based on relevance to the search criteria. A set of search results can include content. Typically, the user has to view the item of content returned in a set of search results, to determine whether the content is content in which the user has interest.

SUMMARY

It would be beneficial to be able to provide a piece, or portion, of an item of content as a preview of the content. Disclosed herein are system, method and apparatus for generating one or more previews of an item of content, each preview comprising some portion of the item of content.

One or more content previews can be provided for the user to experience, e.g., using a media player application, such as a player that runs in a browser. As such, the user can play a preview of the content, which preview(s) can help the user make a determination about the item of content as a whole from the preview(s). In accordance with one or more embodiments, a preview comprises at least one clip having a starting, or start, point and an ending, or end, point. In a case that the preview is formed from multiple clips, the multiple clips are combined, e.g., multiplexed and synchronized, to form the preview.

In accordance with one or more embodiments, each of the starting and ending points of a clip correspond to a shot boundary identified in the content, e.g., video content. In accordance with one or more such embodiments, a shot comprises a contiguous sequence of one or more frames, e.g., one or more contiguous frames that depict continuous action in video content. A shot boundary is a dividing point between two shots, e.g., the end of one shot and the beginning of another shot.

In accordance with one or more embodiments, a method is performed by at least one computing device that identifies a number of clipping points to use in generating a content preview for a content item, and identifies a clipping point duration. The content item has a plurality of shot boundaries, each shot boundary represents a marked content change within the content item. For the content preview, each clipping point is processed to identify a clip that corresponds to the clipping point. In processing the clipping point to identify the corresponding clip, the clipping point's location is determined using the content preview duration and the number of clipping points; the clip's target duration is determined using the content preview duration and the number of clipping points that remain to be processed; a first point is identified that corresponds to the determined clipping point's location; a starting point for the clip is identified that corresponds to a shot boundary identified from the plurality of shot boundaries using the clipping point's first point; a second point for the clip is identified using the clip's starting point and target duration; and the clip's ending point is identified that corresponds to a shot boundary identified from the plurality of shot boundaries using the clipping point's second point. A content preview is generated for the content item using the clip corresponding to each clipping point processed.

In accordance with one or more embodiments, a computer readable storage media tangibly stores thereon computer readable instructions that when executed by a processor cause a computing device to identify a number of clipping points to use in generating a content preview for a content item, and a clipping point duration. The content item has a plurality of shot boundaries, each shot boundary represents a marked content change within the content item. The computer readable instructions that when executed by a computer device's processor further causes the computing device to, for each clipping point, process the clipping point to identify a clip that correspond to the clipping point. In processing each clipping point to identify the corresponding clip, the computer readable instructions that when executed by the computer device's processor further cause the computing device to determine the clipping point's location using the content preview duration and the number of clipping points; determine the clip's target duration using the content preview duration and the number of clipping points that remain to be processed; identify a first point that corresponds to the determined clipping point's location; identify a starting point for the clip that corresponds to a shot boundary identified from the plurality of shot boundaries using the clipping point's first point; identify a second point for the clip using the clip's starting point and target duration; and identify the clip's ending point that corresponds to a shot boundary identified from the plurality of shot boundaries using the clipping point's second point. The computer readable instructions that when executed by the computer device's processor further cause the computing device to generate a content preview for the content item using each identified clip.

In accordance with one or more embodiments, a system comprises a server computer. The system's server computer comprises a processor and memory, the memory stores and the processor executes logic to identify a number of clipping points to use in generating a content preview for a content item, and a clipping point duration. The content item has a plurality of shot boundaries, each shot boundary represents a marked content change within the content item. The memory further stores and the processor further executes logic to, for each clipping point, process the clipping point to identify a clip that correspond to the clipping point. In processing each clipping point to identify the corresponding clip, the computer readable instructions that when executed by the computer device's processor further cause the computing device to determine the clipping point's location using the content preview duration and the number of clipping points; determine the clip's target duration using the content preview duration and the number of clipping points that remain to be processed; identify a first point that corresponds to the determined clipping point's location; identify a starting point for the clip that corresponds to a shot boundary identified from the plurality of shot boundaries using the clipping point's first point; identify a second point for the clip using the clip's starting point and target duration; and identify the clip's ending point that corresponds to a shot boundary identified from the plurality of shot boundaries using the clipping point's second point. The memory further stores and the processor further executes logic to generate a content preview for the content item using each identified clip.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code, logic, instructions, etc. to implement functionality in accordance with one or more such embodiments is embodied in, by and/or on a computer-readable storage medium for tangibly storing the program code, instructions, executable code, and the like.

DRAWINGS

The above-mentioned features and objects of the present disclosure will become more apparent with reference to the following description taken in conjunction with the accompanying drawings wherein like reference numerals denote like elements and in which:

FIG. 1 provides a block diagram of components of a system in accordance with one or more embodiments of the present disclosure.

Figure 2A:
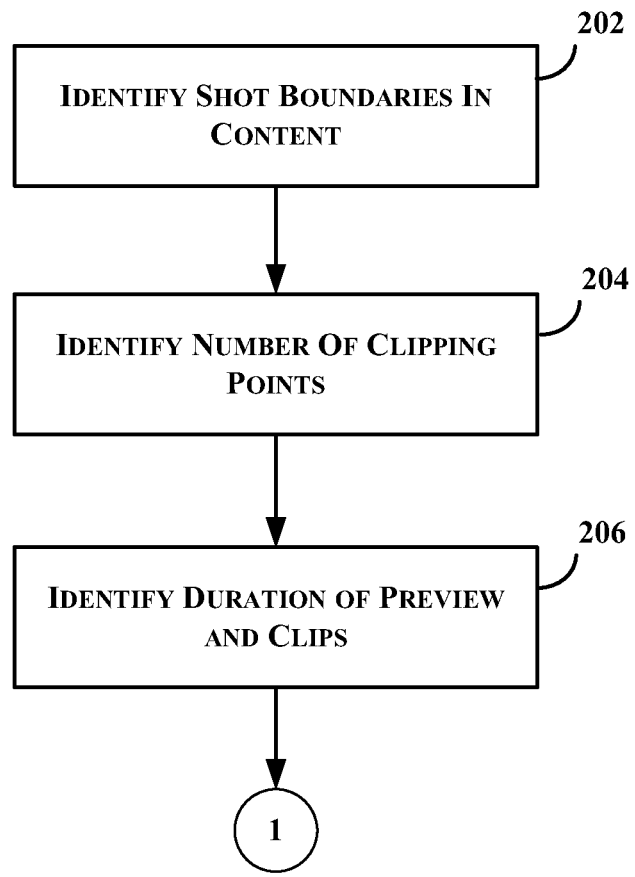
Figure 2B:
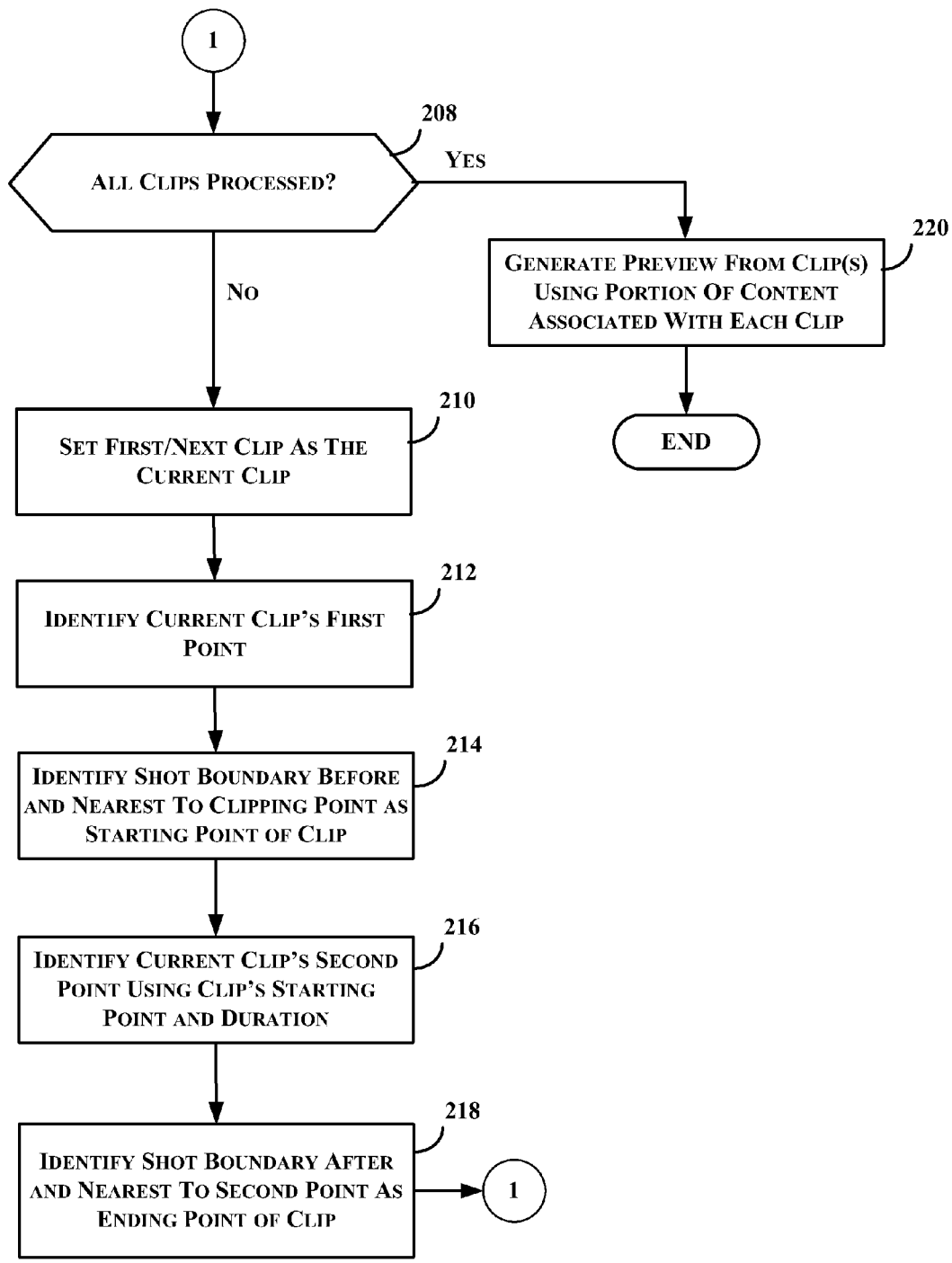

FIG. 2, which comprises FIGS. 2A and 2B, provides a flow diagram of a process in accordance with one or more embodiments of the present disclosure.

FIG. 3 provides an example of a content timeline and three clipping points in accordance with one or more embodiments of the present disclosure.

FIG. 4 provides an example of a content timeline and five clipping points in accordance with one or more embodiments of the present disclosure.

Figure 5:
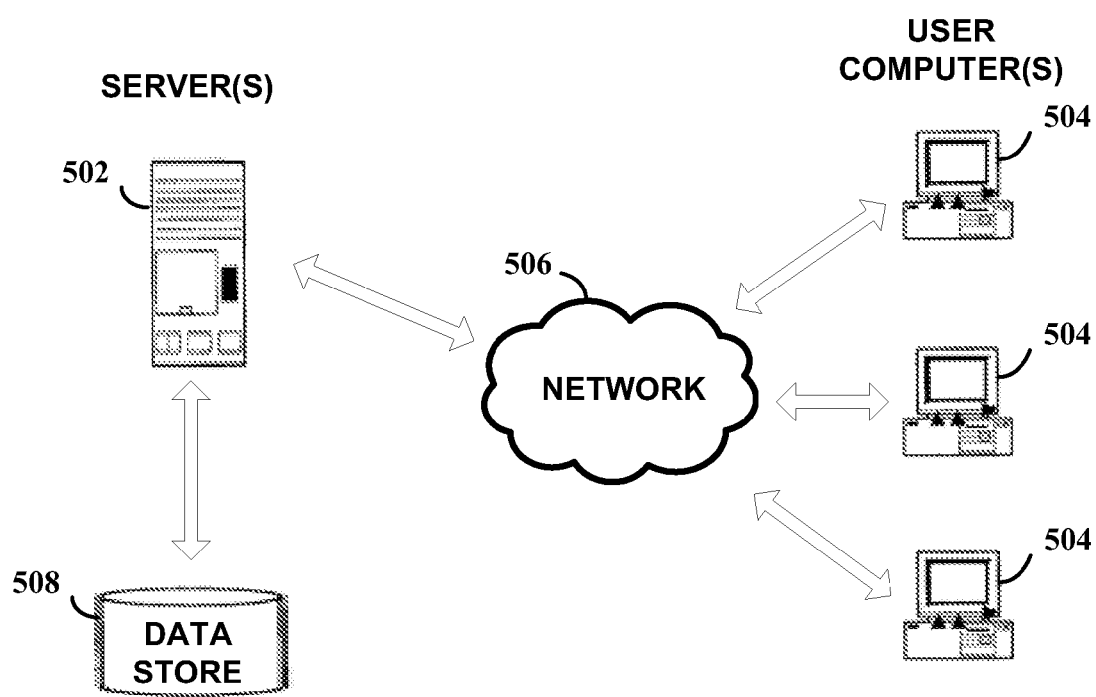

FIG. 5 illustrates some components that can be used in connection with one or more embodiments of the present disclosure.

Figure 6:
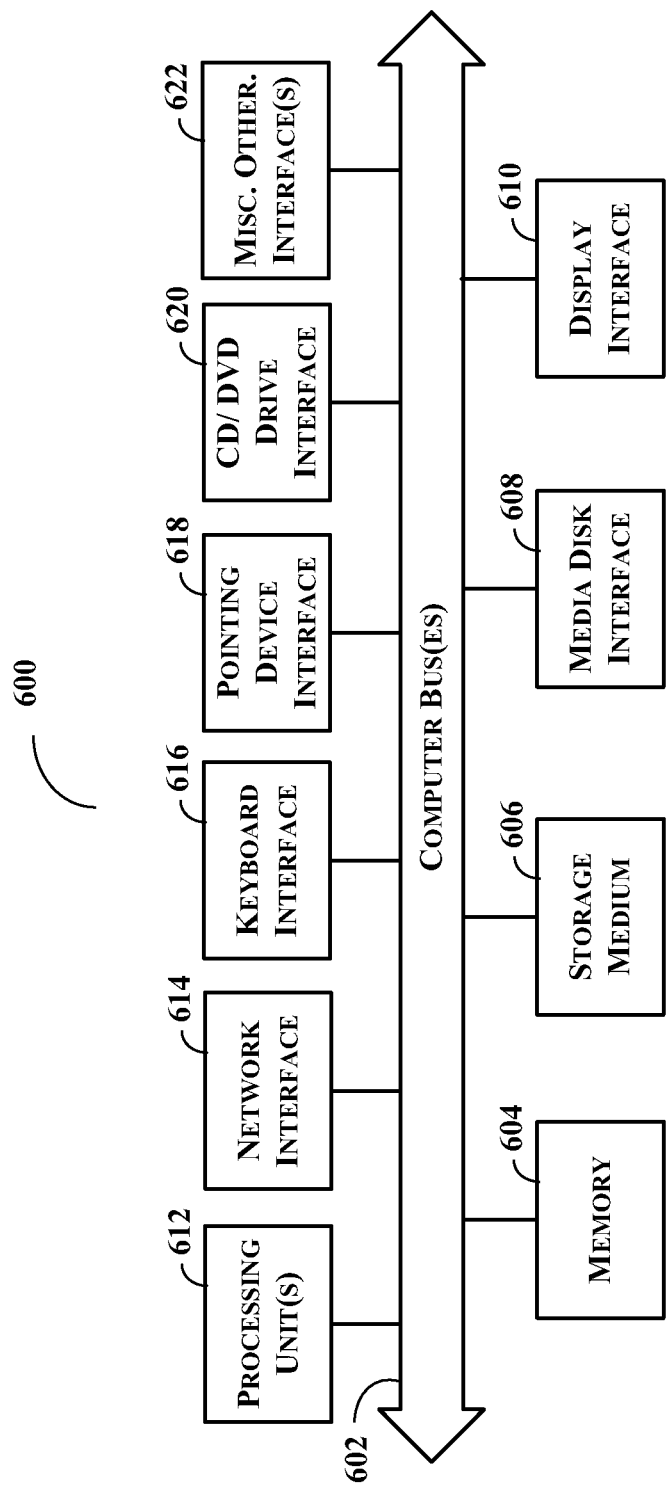

FIG. 6 provides a block diagram illustrating an internal architecture of a computing device in accordance with one or more embodiments of the present disclosure.

DETAILED DESCRIPTION

In general, the present disclosure includes a content preview generation system, method, apparatus and architecture. One or more previews of an item of content is/are generated, each preview comprising some portion of the item of content.

Certain embodiments of the present disclosure will now be discussed with reference to the aforementioned figures, wherein like reference numerals refer to like components.

A content preview of a content item is generated by extracting one or more clips from the content item, each clip has a starting point and an ending point; a clip's starting and ending points correspond to locations in the content item that are identified using a clipping point, or region, first and second points associated with the clipping point, and a target duration for the clip. In accordance with one or more embodiments, the first point corresponds to the clip's clipping point, which is determined based on the number of clips desired to form the content preview and a desired, or target, duration of the content item. The second clipping point is determined based on the clip's starting point and a target, or desired, duration for the clip, e.g., the clip's ending point is a location along the content item's timeline determined by adding the clip's target duration to a location corresponding to the clip's starting point. By way of a non-limiting example, shot boundaries are identified within the content item, each shot boundary has a time attribute that identifies the shot boundary's location along the content item's timeline. The clip's starting point is identified using the first clipping point and a shot boundary identified as being before, e.g., in time, and closest, e.g., in distance measured in time, to the first clipping point, the clip's ending point is identified using the second clipping point and a shot boundary identified as being after, e.g., in time, and closest, e.g., in distance measured in time, to the second clipping point. In a case that multiple clips are generated for the content preview, the clips are multiplexed to form the content preview. In a case that the content item comprises different types of content, such as audio and video content, the audio and video content is extracted from the content item for each clip, and synchronized to form the clip.

One or more content previews can be provided for the user to experience, e.g., using a media player application, such as a player that runs in a browser. As such, the user can play a preview of the content, which preview(s) can help the user make a determination about the item of content as a whole from the preview(s). In one non-limiting example, a set of search results can contain one or more search result items that comprise a content item for review by the user, and a preview of each content item can be provided to the user for the review. The preview can be reviewed by the user to determine whether or not the user wishes to access the content item.

In accordance with one or more embodiments, the starting and ending points of a clip correspond to a shot boundary identified in the content item. A shot boundary comprises a contiguous sequence of one or more frames, e.g., one or more contiguous frames that depict continuous action in video content. In video content, a shot boundary is a dividing point between two shots, e.g., the end of one shot and the beginning of another shot. Various techniques now known and later discovered can be used to determine a shot boundary in a content item. A shot boundary can represent an identified or marked change, e.g., a significant or other type of change identified, in the content of the content item.

In accordance with one or more embodiments, each shot boundary corresponds to an intraframe, or I-frame, in a content item. An I-frame is also referred to herein as a keyframe. An I-frame is used in video compression, such as in the video compression used in the Moving Picture Experts Group (MPEG) standard. In a motion sequence, such as may be found in video content, an I-frame groups individual frames of pictures or images. A grouping can be referred to as a group of pictures (GOP). An I-frame can be played back so that the user can experience motion, e.g., spatial motion.

An I-frame is used in accordance with one or more embodiments, since it is typically independent of other frames, e.g., a predictive frame (P-frame), or a bidirectional or bidirectional predictive frame (B-frame) that may precede and follow it. An I-frame can be interspersed with P-frames and B-frames in the digital content, e.g., compressed video content. Generally speaking, the more I-frames that are contained in the content item the better quality the video. Typically, while all of the data that is needed to display an I-frame is stored as part of the I-frame, frames such as P-frames and B-frames depend on I-frame data to display their frames. A P-frame, follows an I-frame and contains the data that has changed from the preceding I-frame, e.g., changes in color and/or content. Accordingly, a P-frame depends on an I-frame to fill in most of the data of the frame represented by the P-frame. A B-frame, relies on the frames preceding and following the B-frame. A B-frame contains the data that has changed from the preceding frame or that is different from the data in the next frame.

FIG. 1 provides a block diagram of components of a system in accordance with one or more embodiments of the present disclosure. System 100 comprises shot boundary identification module 102, clipping point identification module 104, clip definition module 106, and content extraction and preview formation module 108. In accordance with one or more embodiments, modules, such as modules 102, 104, 106, 108, can be implemented in hardware, as software, such as program code, executable code, instructions, logic, and the like, that is stored in a computer-readable medium and/or executed by a computing device, and/or some combination of software and hardware.

In accordance with one or more embodiments, system 100 uses configuration parameters 110, which can include without limitation a number of clips used to form a preview and a duration of the content preview. In accordance with one or more embodiments, the content preview duration is the aggregate of the durations of the clips that are used to form the content preview. The number of clips and/or the content preview's desired, or target, duration can be pre-configured, or determined by system 100. In the latter case, the number of clips and/or duration can be identified based on such factors as, for example, the length of the content item, a desired length of a preview, etc. In accordance with one or more embodiments, each clip may have a target duration that is $1/n^{th}$ of the content preview's target duration, where n is the number of clips in the content preview. In accordance with one or more embodiments, one clip's duration can differ from another clip's duration, and each clip may have its own respective duration. By way of a non-limiting example, the clip duration can be based on the start and end points determined for the clip. As is described in accordance with one or more embodiments, the start and end points can correspond to shot boundaries, and a clip's actual duration can be defined by the clip's start and end shot boundaries, e.g., the duration, or length, of the content item from the clip's start shot boundary to the clip's end shot boundary. In accordance with one or more embodiments, as is shown in pseudo code hereinbelow, a clip's target duration can be determined dynamically based on such factors as the content preview duration, a partial aggregate duration determined by aggregating the duration(s) of each of the clip(s) already determined for the content preview, a remaining duration amount determined based on the content preview duration, the partial aggregate and the number of clips remaining to be determined, etc.

In accordance with one or more embodiments, shot boundary identification module 102 can use predefined I-frames, or another type of shot boundaries, or can analyze the content item to identify, locate and/or define I-frames, or other type of shot boundaries, in a content item 112. By way of some non-limiting example, predefined I-frames can be included in a file, an MPEG file, that contains the content item 112, or the predefined I-frames can be stored independent of the content item 112.

In a case that the shot boundary identification module 102 determines a content item's 112 shot boundaries, module 102 can use any method, operation, and/or tool now known or later developed to identify each shot boundary in content item 112, by analyzing frames contained in content item 112. By way of one non-limiting example, a shot boundary can be identified based on changes in frames, e.g., changes in content, such as background, objects, object movement and/or positioning, etc.

In accordance with one or more embodiments, clipping point identification module 104 identifies a number of clipping points, and a clip duration. The number of clipping point(s) and clip duration can be predefined as part of the configuration parameters 110, and input to the clipping point identification module 104. Alternatively, the clipping point identification module 104 can identify the number of clipping points and/or the clip duration based on one or more factors, such as, the type of content, the length of content item 112, the use of the content preview 114, the length of content preview 114, etc. As yet another alternative, the clipping point identification module 104 can receive multiple alternatives for the number of clipping points and clip duration, and the module 104 can select from the alternatives based on factors such as those described above, for example.

In accordance with one or more embodiments, clip definition module 106 uses clipping point and clipping, or clip, duration to define a clip used to form content preview 114. Each clipping point corresponds to a clip and is used to identify a portion of the content item 112 to use for the corresponding clip. In accordance with one or more embodiments, the number of clipping points can be used to identify each clipping point, each clipping point can be used to identify a start of a clip corresponding to the clipping point, and a clip duration can be used to identify an end of a clip corresponding to the clipping point. In accordance with at least one embodiment, a clip's starting and ending points correspond to points, or locations, in content item 112, the clip's starting point, or location, corresponds to the start of an I-frame that is located before and nearest to the clipping point, and the clip's ending point, or location, corresponds to an I-frame, e.g., an end of the I-frame, which is located after and nearest to the point, or location, in content item 112 that is determined by adding the clipping point duration to the clip's starting point's location in content item 112. In accordance with one or more embodiments, clipping duration and, locations, or points in content, such as content item 112, are expressed in units of time, such as and without limitation, minutes, seconds, etc. It should be apparent that any other unit of measure can be used as well, and/or any other mechanism can be used to express a content location.

In accordance with one or more embodiments, the one or more clipping points defined by the clip definition module 106 can be evenly distributed within the content item 112, e.g., along the timeline of the content item 112. Clip definition module 106 can take into consideration the likelihood, which can be highly likely, that the most important portion(s) of the content item 112 is found around the middle of the content item 112. In such a case, one of the clipping points can be located at the middle, or half, position of the content item 112, with the remaining clipping points being evenly distributed along the timeline of the content item 112. In accordance with one or more embodiments, in a case that the number of clips is an odd number, one of the clipping points is located at the middle, or halfway along, the content item 112.

Content extraction and preview formation module 108 extracts content corresponding to each clip defined by the clip definition module 106 using the clip's starting and ending points, or locations, in content item 112. In accordance with one or more embodiments, packets, e.g., audio, video or both packet types, corresponding to each clip are extracted from content item 112 and multiplexed to form content preview 114, and timestamps are adjusted accordingly. In accordance with one or more embodiments, audio and video packets extracted from content item 112 are multiplexed on the fly, in a format that is desired by the user. In accordance with one or more embodiments, the content preview 114 can be generated in response to a user selecting a user-selectable indicia of the content item 112. In accordance with one or more embodiments, the clip definition module 106 synchronizes audio and video content of a multimedia content item.

Advantageously and by extracting the raw audio and video packets from the content item 112 and multiplexing the extracted packets, transcoding, e.g., conversion from one encoding format to another, decoding, encoding and/or re-encoding/recoding, can be avoided. Transcoding, decoding, encoding and/or recoding can result in decreased quality, e.g., from an introduction of compression artifacts caused by the coding, as well as requiring additional processing resources and time, which can result in delays in providing the content preview 114. Additionally and advantageously, by selecting shot boundaries as the starting and ending points of a clip as is described herein in accordance with one or more embodiments, blurring, such as that caused by content changes associated with frames, can be minimized or altogether avoided.

In accordance with one or more embodiments, the content preview 114 can be returned as part of a set of search results, such that the content preview 114 corresponding to the content item 112 is selectable by the user as part of a search result item in the set of search results. By way of a non-limiting example, the content preview 114 can be selected by the user by placing the cursor over an indicia, such as a thumbnail image or other indicia, representing the content preview 114 and/or the content 112. By way of a further non-limiting example, the user can experience the content preview 114 by positioning the cursor over the user-selectable indicia of the content preview 114. If the user is interested in experiencing the content item 112 corresponding to the content preview 114, the user can select a selectable indicia of the content item 112.

By way of a non-limiting example, system 100 can be a component of a search engine, or system. By way of a further non-limiting example, the content preview 114 can be generated in response to a search query submitted to the search engine. In such a case, the content previews 114 formed, or generated, for responding to a particular search query can be saved for subsequent use in connection with responding to another search query. By way of yet another non-limiting example, some or all of the content previews 114 are be formed independent of a particular search query, and can be formed for some or all of the content searchable by the search engine.

FIG. 2, which comprises FIGS. 2A and 2B, provides a flow diagram of a process in accordance with one or more embodiments of the present disclosure. In accordance with one or more embodiments, some or all of the operations of the process shown in FIG. 2 can be performed by system 100. By way of some non-limiting examples and in accordance with one or more embodiments, operation 202 can be performed by shot boundary identification module 102, operations 204 and 206 can be performed by clipping point identification module 104, operations 208, 210, 212, 214, 216, 218 and 220 can be performed by clip definition module 106, and operation 218 can be performed by content extraction and preview formation module 108. In accordance with one or more such embodiments, the functionality described in connection with modules 102, 104, 106 and 108 can be incorporated into the corresponding operations described in FIG. 2.

At block 202, shot boundaries in the content item 112 are identified. As described herein, a shot boundary can be identified using any mechanism now know or later developed or discovered. In accordance with one or more embodiments and without limitation, a shot boundary corresponds to an I-frame identified in the content item 112. As described herein, shot boundaries can be predefined, or predetermined, or determined as part of a process, such as the process shown in FIG. 2.

At block 204, a number of clipping points is identified. At block 206, preview and clip durations are identified. As described herein, in accordance with one or more embodiments, the number of clips and/or preview duration can be predefined as part of the configuration parameters 110, selected from a number of options identifying a clip number and/or clip duration alternatives, and/or selected according to such factors as a desired length of the content preview 114, a length of the content item 112, etc. The preview duration and clip duration specified in block 204 are target, or desired, values. In accordance with one or more embodiments, each clip has a target clip duration that is $1/n^{th}$ of the target content preview duration, where n is the number of clips used to form the content preview. In accordance with one or more embodiments, an actual duration of the content preview is based on the aggregate duration of the clips used to form the content preview; and the actual duration of each clip is determined based on the starting and ending points determined for the clip.

At decision block 208, a decision is made whether or not all of the clips have been processed for definition. If so, processing continues at block 218 to generate the content preview 114 using the one or more defined clips, each of which has a starting point and an ending point in the content item 112. By way of some non-limiting examples, any of the methods described herein, including those described in connection with module 108, can be used to form the content preview 114. It should be apparent that other methods now known or later discovered can be used to form the content preview 114.

If it is determined, at decision block 208, that there are clips remaining to be processed, processing continues at step 210 to set the first, or next, clip as the current clip. In accordance with one or more embodiments, the number of clips corresponds to the number of clipping points. By way of a non-limiting example, FIG. 3 provides an example of a content timeline and three clipping points in accordance with one or more embodiments of the present disclosure. In this example, since the number of clipping points, points 304, is three, the number of clips is three, and each clip corresponds to one of the clipping points 304. In the example, one of the three clipping points 304 is located at the midpoint, as designated by the "½" indicator, of the content timeline 300 of a content item, such as content item 112. In the example, the content timeline 300 is expressed in terms of minutes and seconds. As described herein, however, time, e.g., a content timeline, can be expressed using any unit of measure. The remaining clipping points are evenly distributed, e.g., located, or positioned, at one-third, designated with the "⅓" indicator, and two-thirds, designated with the "⅔ "indicator, of the way along content timeline 300. In the example shown in FIG. 3, the content item has an overall duration of three minutes, with a start time 302 at 0 minutes and an end time 302 at 3 minutes, and points 302 located at 1, 1.5 and 2 minutes, which correspond, respectively, to the ⅓, ½ and ⅔ clipping points 304. In other words, the clipping point 304 occurring ⅓ of the way along content timeline 300 is located, or positioned, at 1 minute, zero seconds (e.g., 1 or 1.0 minutes), the clipping point 304 occurring ½ of the way along content timeline 300 is located at 1 minute, thirty seconds (e.g., 1.5), and the clipping point 304 occurring 2.3 of the way along content timeline 300 is located at 2 minutes, zero seconds (e.g., 2 or 2.0).

FIG. 4 provides another example of a content timeline having five clipping points in accordance with one or more embodiments of the present disclosure. In the example shown, five clipping points 404 are used, with one located at the midpoint, halfway, along timeline 400 and the remaining clipping points are evenly distributed along content timeline 400, at ⅕, ⅖, ⅗ and ⅘ along the timeline 400. Clipping points 404 correspond to points 402 located at 1, 2, 2.5, 3 and 4 minutes along the content timeline 400 that has a time span from 0 to 5 minutes. In the example shown in FIG. 4, since the number of clipping points 404, is five, the number of clips is five, and each clip corresponds to one of the clipping points 404.

In accordance with one or more embodiments, a clipping area is identified, which is around, about, proximate to, or surrounding, a clipping point. Referring again to FIG. 2B, at block 212, first and second points, which can be referred to as initial starting and ending points, are identified based on the current clip's clipping point and the clip duration. By way of a non-limiting example, in a case that the current clip corresponds to the ⅕ clipping point 404 located at the 1 minute mark 402 along timeline 400, the first point, or initial starting point, is identified as being located at the 1 minute mark 402, and the second point, or initial ending point, is identified as being located at mark 418. Mark 418 is determined to be a distance corresponding to the clip duration 416 of time from the ⅕ clipping point 404, e.g., the clip's starting point corresponding to the ⅕ clipping point 404. In the latter example, mark 418 can be determined to be a distance corresponding to the clip's target duration 416 of time from element 408; as is described below, element 408 cam be identified as the clip's starting point and corresponds to a shot boundary 408 that is closest to and before the ⅕ clipping point 404.

At block 212 of FIG. 2B, the current clip's starting point is identified using the current clip's first point, and the current clip's clipping point can be used as the clip's first point. In accordance with one or more embodiments, the current clip's starting point is identified and corresponds to a shot boundary, e.g., an I-frame, which is located before and nearest, or closest or more proximate, to the first point identified at block 212. Referring to FIG. 4, elements 406, 408, 410, 412, and 414 correspond to shot boundaries identified for the content item. In the case of the ⅕ clipping point 404, shot boundaries 406 and 408 are located before the first point determined for the clip corresponding to the ⅕ clipping point 404, and shot boundaries 412 and 414 are located after the second point, point 418, determined for the clip corresponding to the ⅕ clipping boundary 404. In accordance with one or more embodiments described herein, using the ⅕ clipping point 404 as an example, shot boundary 408 is selected as the starting point of the corresponding clip, since it is the nearest, or closest or more proximate, to shot boundary before the ⅕ clipping point 404, e.g., shot boundary 408 is closer to the first point of the ⅕ clipping point 404 than shot boundary 406, which is also before the ⅕ clipping point 404.

At block 216, the clip's second point is determined using the clip's starting point identified in block 214 and the clip's target duration. In accordance with one or more embodiments, each clip has a clip duration that can differ from the target clip duration and/or the clip duration of one or more other clips identified for the content preview. A previously-determined clip's actual clip duration, which may be greater, or less than, the previously-determined clip's target duration. In such a case, the target duration for a subsequently-determined clip, which may include the current clip, can be modified, or adjusted, to compensate for the duration variance(s) of the previously-determined clip(s). At block 218, the current clip's ending point is identified using the second point identified at block 216. In accordance with one or more embodiments, the current clip's ending point is identified and corresponds to the ending point of a shot boundary that is located after and nearest, or closest or more proximate, to the second point. Referring again to FIG. 4, using point 418, which is duration 416 from starting point 408, as an example, shot boundary 412 is selected, since it is after point 418 and is nearest, or closest or more proximate, to point 418 than is shot boundary 414, which is also after point 418.

As discussed above, once all of the clips have been processed, the content preview 114 is formed using the portions of the content item 112 identified for each clip. The preview is generated at block 220 of FIG. 2B.

In accordance with one or more embodiments, and in a case that shot boundaries correspond to I-frames in an MPEG-formatted item of content containing I-frames with one or more B-frames and/or P-frames, a clip comprises at least two I-frames, each one corresponding to a shot boundary selected in one of blocks 214 and 218, and can also comprise none or more B-frames and/or P-frames.

In accordance with one or more embodiments, the MEncoder library, see for example, www.mplayerhq.hu, is used to generate a content preview. The MEncoder library takes an input stream or file as input and can transcode the input stream into one or more output formats, and can optionally apply various transforms as well. It is also possible to copy audio and/or video unmodified into the output file to avoid quality loss because of re-encoding for example, to only modify the audio or video, or to simply put the audio/video data unmodified into a different container format, e.g., a meta-file format with a corresponding specification describing how data and metadata are stored.

In accordance with one or more embodiments, the following flow expressed in pseudo code can be used to identify the information that is passed to the MEncoder library to generate a preview in accordance with one or more embodiments of the present disclosure. In a case that the content includes both audio and video components, embodiments of the present disclosure use the MEncoder library to synchronize the audio and video components. Inputs to the following pseudo code include video path, e.g., such as that shown in FIGS. 3 and 4, number of scenes to be included in preview, and total duration of preview. Additionally and as discussed herein, the shot boundaries for the media content, e.g., video, audio or both, are determined. In accordance with one or more embodiments, in the pseudo code, a scene corresponds to a clip; and while the term video is used, it should be apparent that the pseudo code is applicable to any type of content now known or later developed. In accordance with one or more embodiments, for given number of clips n, the clipping regions are identified as follows:

START
1. Generate a list of regions, or region list, using the number of clips,

-continued

```
        n, and the duration of the video:
            if n is an even number, add n elements to the region list, so that
                the region list contains a listing of element locations within the
                video, each element location in the region list is determined as
                follows:
                    ((x/n)*duration of video), where x is an integer from 1 to n
            else (i.e., n is an odd number), the n-1 element(s) in the region
                list is/are determined such that:
                    for x = 1 to n-1: a value, or element, is added to the region
                        list that is determined as follows:
                            ((x/n)*duration of video), and
                    for the n^th element: a value, or element, is added to the
                        region list that is determined as follows:
                            (duration of video/2)
    2.  Set variables for repeat loop, as follows:
            duration of preview = minimum of ((input preview duration) and
                (duration of video)), and
            number of scenes = n
    3.  BEGIN repeat loop to generate scene list, the repeat loop loops
        while i < n, where i is a loop counter that is initialized to 0 and is
        incremented by 1, so that the repeat loop processes each region,
        or clipping point, in the region list, or clipping point list.
            set duration per scene: if(number of scenes = zero), duration per
                scene is set to 0, else duration per scene = (duration of
                preview/number of scenes)
            latest scene = element at top of scene list, if its empty, then its
                (0,0) where scene is {lower scene boundary, upper scene
                boundary}
            current lower = maximum of (nearest shot boundary <=region
                list[i]) and latest scene upper
            current upper = nearest shot boundary >= (current lower +
                duration per scene)
            if (current upper > duration of video), current upper = duration
                of video push {current lower, current upper} at top of scene list
            duration of preview = duration of preview - (current upper –
                current lower)
            decrement number of scenes
    4.  END repeat loop
    5.  Submit input video, or other content, and all the boundaries to
        MEncoder library to generate the preview
END
```

One or more embodiments of the present disclose a method using at least one computing device to, a system comprising a processor executing and memory storing logic to, and/or a computer readable storage media for tangibly storing thereon computer readable instructions that when executed by a processor causes a computing device to generate a content item's preview in accordance with the above pseudo code. A number of clips, "n", are identified for a content preview corresponding to a content item. The content item has a duration and a plurality of shot boundaries, each shot boundary representing a marked content change within the content item. A region list is generated and identifies "n" number of regions of the content item. A number, "x" entries are added to the region list, where "x" is an integer from one to "n" if "n" is an even number, and "x" being an integer from one to "n-1" if "n" is an odd number, for each "x", the corresponding region's entry in the region list is determined by obtaining a result of dividing "x" by the number of regions, "n", and multiplying the result by the duration of the content item. If the number of regions, "n", is an odd number, another entry is added to the region list that identifies another region's location in the content item, the other region's location being a midpoint of the content item, which is obtained by dividing the content duration in half. A target duration is determined for the content preview, the content preview's target is less than or equal to the content item's duration. Each region identified in the region list is processed, using the region's location specified in the region list, to identify a clip corresponding to the region. For each clip of a number of remaining clips that is initially set to the number of clips, "n", the clip's target duration is obtained by dividing the content preview's target duration by the number of remaining clips; the clip's lower location within the content item is identified as a maximum of a latest clip upper location and a location of a shot boundary determined to be located before and nearest to the location of the current clip's region, where the latest clip upper location is initially set to zero; the clip's upper location within the content item is identified as the location of a shot boundary that is located nearest to a location determined by adding the location of the clip's lower location and the clip's target duration; the clip's upper location is set to the duration of the content item if the clip's upper location exceeds the duration of the content item; the clip's lower location and upper location are added as a pair in an entry in a clip list, and setting the clip's upper location as the latest clip upper location; the clip's actual duration is determined to be a difference of the clip's lower location and upper location, and the content preview's target duration is updated to reflect the clip's actual duration; and the remaining number of clips is decremented by one. The content preview is generated for the content item using the clip corresponding to each region processed.

FIG. 5 illustrates some components that can be used in connection with one or more embodiments of the present disclosure. In accordance with one or more embodiments of the present disclosure, one or more computing devices, e.g., one or more server computers 502, user computers or devices 504, are configured to comprise functionality described herein. For example, a server computer 502 can comprise one or more of components 102, 104, 106 and/or 108 of system 100 and its functionality, and/or perform processes and functionality such as those shown in FIG. 2. It should be apparent that one or more of the modules 102, 104, 106 and 108 can be located or performed on the same computing device 502, or different computing devices 502. It should also be apparent that one or more operations shown in FIG. 2 can be performed on the same computing device 502, or different computing devices 502.

In accordance with one or more embodiments, computing device 502 can serve content, e.g., content preview 114, content 112, etc., to user computers 504 using a browser application via a network 506. Computers 504 can be used to input a search query that is directed to server computer 502. Data store 508 can be used to store configuration parameters 110, content, 112, content preview 114, and/or program code to configure a server 502 to execute the system 100, one or more of modules 102, 104, 106 and 108, and/or one or more operations shown in FIG. 2.

The server computer 502 and/or the user computer 504 can be any computing device, including without limitation a personal computer, personal digital assistant (PDA), wireless device, cell phone, internet appliance, media player, home theater system, and media center, or the like.

For the purposes of this disclosure a computing device includes a processor and memory for storing and executing program code, data and software, and may be provided with an operating system that allows the execution of software applications in order to manipulate data. A computing device such as server 502 and the user computer 504 can include one or more processors, memory, a removable media reader, network interface, display and interface, and one or more input devices, e.g., keyboard, keypad, mouse, etc. and input device interface, for example. One skilled in the art will recognize that server 502 and user computer 504 may be configured in many different ways and implemented using many different combinations of hardware, software, or firmware.

In accordance with one or more embodiments, a computing device 502 can make a user interface available to a user computer 504 via the network 506. The user interface made available to the user computer 504 can include content items, or identifiers (e.g., URLs) selected for the user interface in accordance with one or more embodiments of the present disclosure. By way of some non-limiting examples, computing device 502 can provide computing device 504 with the content preview 114, content item 112, and/or a user-selectable identifier of the content preview 114 content item 112. By way of some further non-limiting examples, computing device 502 can provide computing device 504 with a set of search results that include user-selectable identifiers that correspond to one or more of the content preview 114 and/or the content item 112. In accordance with one or more embodiments, computing device 502 makes a user interface available to a user computer 504 by communicating a definition of the user interface to the user computer 504 via the network 506. The user interface definition can be specified using any of a number of languages, including without limitation a markup language such as Hypertext Markup Language, scripts, applets and the like. The user interface definition can be processed by an application executing on the user computer 504, such as a browser application, to output the user interface on a display coupled, e.g., a display directly or indirectly connected, to the user computer 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 5. Alternatively, embodiments of the present disclosure can be implemented other environments, e.g., a peer-to-peer environment as one non-limiting example.

FIG. 6 is a detailed block diagram illustrating an internal architecture of a computing device, e.g., a computing device such as server 602 or user computer 604, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
identifying, using at least one computing device, a number of clipping points to use in generating a content preview for a content item, and a content preview duration, the content item having a plurality of shot boundaries and a plurality of frames, each shot boundary representing a marked content change within the content item and each shot comprising at least one frame of the plurality of frames, each clipping point is a single point in the content item;
using the at least one computing device, identifying each clip, the identifying comprising, for each clip:
determining a clipping point without regard to a location of any frame of the plurality of frames of the content item, the clipping point being determined using the content item's duration and the number of clipping points;
determining the clip's target duration using the content preview duration and the number of clipping points that remain to be processed;
identifying a first point in the content item to be the determined clipping point;
identifying a starting point of the clip using the identified first point, the clip's starting point corresponding to a starting point of a shot boundary identified from the plurality of shot boundaries using the first point;
identifying a second point in the content item using the clipping point and the clip's target duration; and
identifying an ending point of the clip using the identified second point, the clip's ending point corresponding to an ending point of a shot boundary identified from the plurality of shot boundaries using the identified second point; and
generating, using the at least one computing device, the content preview for the content item using the clip corresponding to each clipping point processed.

2. The method of claim 1, wherein there are a plurality of clips and each clip has an actual duration and a target duration with respect to another clip of the plurality, and each clip's actual duration can differ from the clip's target duration, the method further comprising:
determining the clip's actual duration using the clip's starting and ending points;
determining whether there is a variance between the clip's target and actual durations;
and if a variance is determined, the method further comprising:
determining a modified content preview duration that includes the variance; and
before processing another clipping point of the plurality of clipping points, updating the content preview duration to reflect the variance.

3. The method of claim 1, further comprising:
for the clip's starting point, selecting, from the plurality of shot boundaries using the at least one computing device, a shot boundary located before and closest to the clipping point's first point, the selected shot boundary is a frame of the plurality of frames and the clip's starting point is the selected frame's starting point.

4. The method of claim 1, further comprising:
for the clip's ending point, selecting, from the plurality of shot boundaries using the at least one computing device, a shot boundary located after and closest to the clipping point's second point, the selected shot boundary is a frame of the plurality of frames and the clip's ending point is the selected frame's ending point.

5. The method of claim 1, wherein the content item has an MPEG format, and each shot boundary in the plurality of shot boundaries is an I-frame.

6. The method of claim 1, wherein there are two or more identified clips, the method further comprising:
extracting, for each identified clip using the at least one computing device, content from the content item starting at the clip's starting point and ending at the clip's ending point;
multiplexing, using the at least one computing device, the content extracted from the content item for each of the two or clips to generate the content preview.

7. The method of claim 1, at least one of the identified clips comprising audio and video content, the extracting further comprising:
extracting, for the at least one identified clip using the at least one computing device, the audio content from the content item starting at the clip's starting point and ending at the clip's ending point;
extracting, for the at least one identified clip using the at least one computing device, the video content from the content item starting at the clip's starting point and ending at the clip's ending point;
synchronizing the extracted audio content and the extracted video content.

8. A computer readable non-transitory storage media for tangibly storing thereon computer readable instructions, the computer readable instructions that when executed by a processor causes a computing device to:
identify a number of clipping points to use in generating a content preview for a content item, and a content preview duration, the content item having a plurality of shot boundaries and a plurality of frames, each shot boundary representing a marked content change within the content item and each shot comprising at least one frame of the plurality of frames, each clipping point is a single point in the content item, the clipping point, a first point and a second point in the content item are used in identifying which of the plurality of frames to include in a clip;
identify each clip, the instructions to identify comprising, for each clip, instructions that when executed by the processor causes the computing device to:
determine a clipping point without regard to a location of any frame of the plurality of frames of the content item, the clipping point being determined using the content item's duration and the number of clipping points;

determine the clip's target duration using the content preview duration and the number of clipping point that remain to be processed;

identify a first point in the content item to be the determined clipping point;

identify a starting point of the clip using the identified first point, the clip's starting point corresponding to a starting point of a shot boundary identified from the plurality of shot boundaries using the identified first point;

identify a second point in the content item using the clipping point and the clip's target duration; and identify an ending point of the clip using the identified second point, the clip's ending point corresponding to an ending point of a shot boundary identified from the plurality of shot boundaries using the identified second point; and generate the content preview for the content item using the clip corresponding to each clipping point processed.

9. The computer readable non-transitory storage media of claim 8, wherein there are a plurality of clips and each clip has an actual duration and a target duration with respect to another clip of the plurality, and each clip's actual duration can differ from the clip's target duration, the computer readable instructions further comprising instructions that when executed by a processor causes a computing device to:

determine the clip's actual duration using the clip's starting and ending points;

determine whether there is a variance between the clip's target and actual durations; and if a variance is determined, the computer readable instructions further comprising instructions that when executed by a processor causes a computing device to:

determine a modified content preview duration that includes the variance; and before another clipping point of the plurality of clipping points is processed, update the content preview duration to reflect the variance.

10. The computer readable non-transitory storage media of claim 8, the computer readable instructions further comprising instructions that when executed by a processor causes a computing device to:

for the clip's starting point, select, from the plurality of shot boundaries, a shot boundary located before and closest to the clipping point's first point, the selected shot boundary is a frame of the plurality of frames and the clip's starting point is the selected frame's starting point.

11. The computer readable non-transitory storage media of claim 8, the computer readable instructions further comprising instructions that when executed by a processor causes a computing device to:

for the clip's ending point, select, from the plurality of shot boundaries, a shot boundary located after and closest to the clipping point's second point, the selected shot boundary is a frame of the plurality of frames and the clip's ending point is the selected frame's ending point.

12. The computer readable non-transitory storage media of claim 8, wherein the content item has an MPEG format, and each shot boundary in the plurality of shot boundaries is an I-frame.

13. The computer readable non-transitory storage media of claim 8, wherein there are two or more identified clips, the computer readable instructions further comprising instructions that when executed by a processor causes a computing device to:

extract, for each identified clip, content from the content item starting at the clip's starting point and ending at the clip's ending point;

multiplex the content extracted from the content item for each of the two or clips to generate the content preview.

14. The computer readable non-transitory storage media of claim 8, at least one of the identified clips comprising audio and video content, the computer readable instructions further comprising instructions that when executed by a processor causes a computing device to:

extract, for the at least one identified clip, the audio content from the content item starting at the clip's starting point and ending at the clip's ending point;

extract, for the at least one identified clip, the video content from the content item starting at the clip's starting point and ending at the clip's ending point; and synchronize the extracted audio content and the extracted video content.

15. A system comprising:

a server computer comprising a processor and a storage medium for tangibly storing thereon program logic for execution by the processor, the stored program logic comprising:

identifying logic executed by the processor for identifying a number of clipping points to use in generating a content preview for a content item, and a clipping point duration, the content item having a plurality of shot boundaries and a plurality of frames, each shot boundary representing a marked content change within the content item and each shot comprising at least one frame of the plurality of frames, each clipping point is a single point in the content item;

identifying logic executed by the processor for identifying each clip, the identifying logic comprising, for each clip:

determining logic executed by the processor for determining a clipping point without regard to a location of any frame of the plurality of frames of the content item, the clipping point being determined using the content item's duration and the number of clipping points;

determining logic executed by the processor for determining the clip's target duration using the content preview duration and a number of clips remaining to be determined;

identifying logic executed by the processor for identifying a first point in the content item using the determined clipping point in the content item;

identifying logic executed by the processor for identifying a starting point of the clip using the identified first point, the clip's starting point corresponding to a starting point of a shot boundary identified from the plurality of shot boundaries using the identified first point;

identifying logic executed by the processor for identifying a second point in the content item using the clipping point and the clip's target duration; and identifying logic executed by the processor for identifying an ending point of the clip using the identified second point, the clip's ending point corresponding to an ending point of a shot boundary identified from the plurality of shot boundaries using the identified second point; and generating logic executed by the processor for generating the content preview for the content item using the clip corresponding to each clipping point processed.

16. The system of claim 15:
for each of a plurality of clips, each clip having an actual duration and a target duration with respect to another clip of the plurality and each clip's actual duration can be different from the clip's target duration, the program logic further comprising:
determining logic executed by the processor for determining the clip's actual duration using the clip's starting and ending points;
determining logic executed by the processor for determining whether there is a variance between the clip's target and actual durations; and if a variance is determined, the program logic further comprising:
determining logic executed by the processor for determining a modified content preview duration that includes the variance; and
updating logic executed by the processor for updating, before another clipping point of the plurality of clipping points is processed, the content preview duration to reflect the variance.

17. The system of claim 15, the program logic further comprising:
selecting logic executed by the processor for selecting, for the clip's starting point, from the plurality of shot boundaries, a shot boundary located before and closest to the clipping point's first point, the selected shot boundary is a frame of the plurality of frames and the clip's starting point is the selected frame's starting point.

18. The system of claim 15, the program logic further comprising:
selecting logic executed by the processor for selecting, for the clip's ending point, from the plurality of shot boundaries, a shot boundary located after and closest to the clipping point's second point, the selected shot boundary is a frame of the plurality of frames and the clip's ending point is the selected frame's ending point.

19. The system of claim 15, wherein the content item has an MPEG format, and each shot boundary in the plurality of shot boundaries is an I-frame.

20. The system of claim 15, the program logic further comprising:
extracting logic executed by the processor for extracting, for each identified clip, content from the content item starting at the clip's starting point and ending at the clip's ending point;
multiplexing logic executed by the processor for multiplexing the content extracted from the content item for each of two or more clips to generate the content preview.

21. The system of claim 15:
extracting logic executed by the processor for extracting, for at least one identified clip comprising audio and video content, the audio content from the content item starting at the clip's starting point and ending at the clip's ending point;
extracting logic executed by the processor for extracting, for the at least one identified clip comprising audio and video content, the video content from the content item starting at the clip's starting point and ending at the clip's ending point; and synchronizing logic executed by the processor for synchronizing the extracted audio content and the extracted video content.

22. A method comprising:
identifying a number of clips, "n", for a content preview corresponding to a content item, the content item having a duration and a plurality of shot boundaries, each shot boundary representing a marked content change within the content item;
generating a region list identifying "n" number of regions of the content item comprising:
adding a number, "x", entries to the region list, "x" being an integer from one to "n" if "n" is an even number, and "x" being an integer from one to "n-1" if "n" is an odd number, for each "x", the corresponding region's entry in the region list being determined by obtaining a result of dividing "x" by the number of regions, "n", and multiplying the result by the duration of the content item;
if the number of regions, "n", is an odd number, adding another entry in the region list identifying another region's location in the content item, the other region's location being a midpoint of the content item, the midpoint being obtained by dividing the content duration in half;
determining a target duration for the content preview, the content preview's target being less than or equal to the content item's duration;
processing each region identified in the region list using the region's location specified in the region list to identify a clip corresponding to the region, by performing, for each clip of a number of remaining clips that is initially set to the number of clips, "n":
obtaining the clip's target duration by dividing the content preview's target duration by the number of remaining clips;
identifying the clip's lower location within the content item, the clip's lower location being identified as a maximum of a latest clip upper location and a location of a shot boundary determined to be located before and nearest to the location of the current clip's region, where the latest clip upper location is initially set to zero;
identifying the clip's upper location within the content item, the clip's upper location being identified as the location of a shot boundary that is located nearest to a location determined by adding the location of the clip's lower location and the clip's target duration;
setting the clip's upper location to the duration of the content item if the clip's upper location exceeds the duration of the content item;
adding the clip's lower location and upper location as a pair in an entry in a clip list, and setting the clip's upper location as the latest clip upper location;
determining the clip's actual duration to be a difference of the clip's lower location and upper location, and updating the content preview's target duration to reflect the clip's actual duration; and
decrementing the remaining number of clips by one; and
generating the content preview for the content item using the clip corresponding to each region processed.

23. A computer readable non-transitory storage media for tangibly storing thereon computer readable instructions, the computer readable instructions that when executed by a processor causes a computing device to:

identify a number of clips, "n", for a content preview corresponding to a content item, the content item having a duration and a plurality of shot boundaries, each shot boundary representing a marked content change within the content item;

generate a region list identifying "n" number of regions of the content item, which includes instructions that when executed by the processor causes the computer device to:

add a number, "x", entries to the region list, "x" being an integer from one to "n" if "n" is an even number, and "x" being an integer from one to "n-1" if "n" is an odd number, for each "x", the corresponding region's entry in the region list being determined by obtaining a result of dividing "x" by the number of regions, "n", and multiplying the result by the duration of the content item;

if the number of regions, "n", is an odd number, add another entry in the region list identifying another region's location in the content item, the other region's location being a midpoint of the content item, the midpoint being obtained by dividing the content duration in half;

determine a target duration for the content preview, the content preview's target being less than or equal to the content item's duration;

process each region identified in the region list using the region's location specified in the region list to identify a clip corresponding to the region, which includes instructions that when executed by the processor causes the computer device to, for each clip of a number of remaining clips that is initially set to the number of clips, "n":

obtain the clip's target duration by dividing the content preview's target duration by the number of remaining clips;

identify the clip's lower location within the content item, the clip's lower location being identified as a maximum of a latest clip upper location and a location of a shot boundary determined to be located before and nearest to the location of the current clip's region, where the latest clip upper location is initially set to zero;

identify the clip's upper location within the content item, the clip's upper location being identified as the location of a shot boundary that is located nearest to a location determined by adding the location of the clip's lower location and the clip's target duration;

set the clip's upper location to the duration of the content item if the clip's upper location exceeds the duration of the content item;

add the clip's lower location and upper location as a pair in an entry in a clip list, and setting the clip's upper location as the latest clip upper location;

determine the clip's actual duration to be a difference of the clip's lower location and upper location, and updating the content preview's target duration to reflect the clip's actual duration; and decrement the remaining number of clips by one; and generate the content preview for the content item using the clip corresponding to each region processed.

24. A system comprising:

a server computer comprising a processor and a storage medium for tangibly storing thereon program logic for execution by the processor, the stored program logic comprising:

identifying logic executed by the processor for identifying a number of clips, "n", for a content preview corresponding to a content item, the content item having a duration and a plurality of shot boundaries, each shot boundary representing a marked content change within the content item;

generating logic executed by the processor for generating a region list identifying "n" number of regions of the content item, the generating logic further comprising:

adding logic executed by the processor for adding a number, "x", entries to the region list, "x" being an integer from one to "n" if "n" is an even number, and "x" being an integer from one to "n-1" if "n" is an odd number, for each "x", the corresponding region's entry in the region list being determined by obtaining a result of dividing "x" by the number of regions, "n", and multiplying the result by the duration of the content item;

adding logic executed by the processor for adding, if the number of regions, "n", is an odd number, another entry in the region list identifying another region's location in the content item, the other region's location being a midpoint of the content item, the midpoint being obtained by dividing the content duration in half;

determining logic executed by the processor for determining a target duration for the content preview, the content preview's target being less than or equal to the content item's duration;

processing logic executed by the processor for processing each region identified in the region list using the region's location specified in the region list to identify a clip corresponding to the region, comprising logic to, for each clip of a number of remaining clips that is initially set to the number of clips, "n", the processing logic executed by the processor further comprising:

obtaining logic executed by the processor for obtaining the clip's target duration by dividing the content preview's target duration by the number of remaining clips;

identifying logic executed by the processor for identifying the clip's lower location within the content item, the clip's lower location being identified as a maximum of a latest clip upper location and a location of a shot boundary determined to be located before and nearest to the location of the current clip's region, where the latest clip upper location is initially set to zero;

identifying logic executed by the processor for identifying the clip's upper location within the content item, the clip's upper location being identified as the location of a shot boundary that is located nearest to a location determined by adding the location of the clip's lower location and the clip's target duration;

setting logic executed by the processor for setting the clip's upper location to the duration of the content item if the clip's upper location exceeds the duration of the content item;

adding logic executed by the processor for adding the clip's lower location and upper location as a pair in an entry in a clip list, and setting the clip's upper location as the latest clip upper location;

determining logic executed by the processor for determining the clip's actual duration to be a difference of the clip's lower location and upper location, and updating the content preview's target duration to reflect the clip's actual duration; and
decrementing logic executed by the processor for decrementing the remaining number of clips by one; and generating logic executed by the processor for generating the content preview for the content item using the clip corresponding to each region processed.

* * * * *